US006937747B2

(12) United States Patent
Culp et al.

(10) Patent No.: US 6,937,747 B2
(45) Date of Patent: Aug. 30, 2005

(54) SYSTEM AND METHOD FOR CAPTURING NON-AUDIBLE INFORMATION FOR PROCESSING

(75) Inventors: Jerlyn R. Culp, Fort Collins, CO (US); Michelle R. Lehmeier, Loveland, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 701 days.

(21) Appl. No.: 09/962,690

(22) Filed: Sep. 24, 2001

(65) Prior Publication Data

US 2003/0059088 A1 Mar. 27, 2003

(51) Int. Cl.[7] .............................................. G01C 21/00
(52) U.S. Cl. ..................................... 382/113; 704/257
(58) Field of Search ................................ 704/257, 260; 382/113, 181, 203

(56) References Cited

U.S. PATENT DOCUMENTS

| 4,958,064 A | | 9/1990 | Kirkpatrick | |
|---|---|---|---|---|
| 5,633,946 A | * | 5/1997 | Lachinski et al. | 382/103 |
| 5,844,505 A | | 12/1998 | Van Ryzin | |
| 6,449,384 B2 | * | 9/2002 | Laumeyer et al. | 382/104 |
| 6,450,056 B2 | * | 9/2002 | Torii et al. | 74/427 |
| 6,473,523 B1 | * | 10/2002 | Newman et al. | 382/176 |
| 6,560,529 B1 | * | 5/2003 | Janssen | 701/200 |

FOREIGN PATENT DOCUMENTS

DE          2910787        10/1980

OTHER PUBLICATIONS

Speech/Language Translator Smart Module, 3 pages www.cs.cmu.edu/afs/cs.cmu.edu/project/vuman/www/translator.html.
Standardized traffic signs, including Index, Sections A–H, Old UK Signalisation www.cwi.nl/dik/english/traffic/signs.

* cited by examiner

Primary Examiner—Daniel Abebe (57) ABSTRACT

According to one embodiment of the present invention, a system for capturing non-audible information for processing thereof is disclosed. The system comprises an optical capture device that is operable to optically scan an area. The optical capture device is also operable to recognize a triggering identifier associated with a visual object within the area, and the optical capture device is operable to process non-audible information captured thereby from the visual object in response to the optical capture device recognizing the triggering identifier associated with the visual object.

43 Claims, 2 Drawing Sheets

SYSTEM AND METHOD FOR CAPTURING NON-AUDIBLE INFORMATION FOR PROCESSING

TECHNICAL FIELD

This invention relates in general to optical capture devices, and more specifically to a system and method for capturing non-audible information for processing.

BACKGROUND

Various devices exist for optically capturing visual objects, such as text on a page, in electronic form (e.g., digital data), and such devices may further process (e.g., manipulate) the captured information in some manner. Specific examples of such devices include optical scanners and digital cameras. Moreover, various devices exist for capturing text from a page and converting the captured text to speech. Such text-to-speech converters are relatively well-known, are generally operable to capture text in a relatively "closed environment," and convert the captured text to speech. That is, such text-to-speech converters typically operate to capture text from a page as specified by a user. Thus, the environment in which such text-to-speech converters generally capture text is relatively closed, as a user typically specifies a defined page (or portion thereof) on which the text to be captured is included. Further, the user typically specifies/controls the specific text to be converted to speech. That is, the user typically dictates to the text-to-speech converter the exact text to be captured for processing (i.e., for converting to speech).

As a further example, various devices exist for capturing text from a page and translating the captured text from one language to another language. Such language translation devices are relatively well-known, and, as with existing text-to-speech converters, they are generally operable to capture text in a relatively "closed environment." That is, such devices typically operate to capture text from a page as specified by a user. Thus, the environment in which such language translation devices generally capture text is relatively closed, as a user typically specifies a defined page (or portion thereof) on which the text to be captured is included. Further, the user typically specifies/controls the specific text to be translated to a different language. That is, the user typically dictates to the language translation device the exact text to be captured for processing (i.e., for translating to a different language).

Generally, language translation devices translate text from one language to another language, and output the translated text in textual format to a user in the desired language. Thus, for example, a user may utilize such a language translation device to scan an item from a restaurant's menu that is written in a language that the user does not understand. The translation device may translate the scanned menu item to a language that is understood by the user, and output text presenting the menu item to the user in the translated language. Such language translation devices do not perform a text-to-speech conversion to output the translated text in audible form.

As described above, various optical capture devices of the prior art for capturing information, such as textual information, are typically implemented to capture such information within a user-defined, closed environment. In this manner, "closed environment" is intended to encompass an environment specifically dictated and/or controlled by a user of an optical capture device as containing a visual object to be captured by the optical capture device for processing. For instance, prior art optical capture devices typically capture text from a page (or portion thereof) as specified by a user. Further, a user typically presents the page (or portion thereof) which includes the text to be captured to the capture device. Thus, the user takes an active part in controlling the environment (e.g., the page) from which the device is to capture text. More specifically, a user controls/specifies the specific page (or portion thereof) from which a device is to capture text for processing.

SUMMARY OF THE INVENTION

According to one embodiment of the present invention, a system for capturing non-audible information for processing thereof is disclosed. The system comprises an optical capture device that is operable to optically scan an area. The optical capture device is also operable to recognize a triggering identifier associated with a visual object within the area, and the optical capture device is operable to process non-audible information captured thereby from the visual object in response to the optical capture device recognizing the triggering identifier associated with the visual object.

DETAILED DESCRIPTION

Situations often arise in which it is desirable to process information captured from visual objects from an open environment that is not dictated/controlled by a user of the optical capture device. As an example, suppose a user is driving an automobile on a highway; it may be desirable to optically capture information from visual objects available along the highway (e.g., road signs) for processing. For instance, suppose a user is driving an automobile in a foreign country in which the user is relatively unfamiliar with the language and/or road sign symbols of such country. An optical capture device that is capable of optically capturing information from the road signs, translating the information to a language understood by the user, and audibly outputting the translated information to the user would be useful in such a situation. Particularly when a user is driving, it may be important to have the information presented in a manner that is easily understood by the user to enable the user to utilize such information while navigating the roadway. Thus, even supposing that such a user is familiar with the language of the foreign country, but is unable to read the language sufficiently well to decipher road signs in the limited time available while driving, an optical capture device that is capable of optically capturing information from the road signs and audibly outputting the information to the user (in the foreign language or the user's primary language) would be useful, as it may enable the user to more readily understand the information while driving. Within such an open-environment, it may be difficult/impossible for a user to dictate/control the specific visual object (e.g., road sign) to be optically captured for processing.

Figure 1:
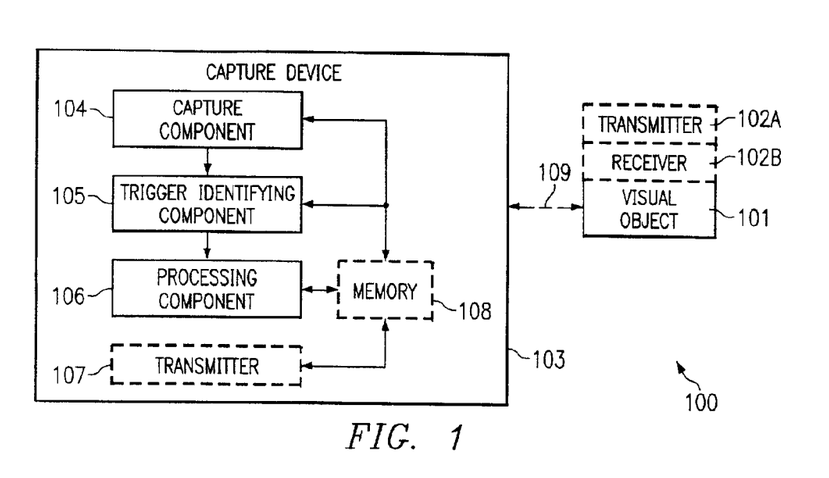
FIG. 1 shows an exemplary system of one embodiment of the present invention.

Various embodiments of the present invention are now described with reference to the above FIGURES, wherein like reference numerals represent like parts throughout the several views. Turning to FIG. 1, an exemplary system 100 of one embodiment of the present invention is shown, which includes visual object 101 and capture device 103. In certain embodiments, visual object 101 may have associated therewith transmitter 102A and receiver 102B, which together may form a transceiver (referred to herein as transceiver 102). Transmitter 102A may be any suitable device for wirelessly transmitting information, such as a strobe light, radio frequency (RF) transmitter, cellular transmitter, etcetera, and receiver 102B may be any suitable receiver for receiving wireless communication. Capture device 103 may include capture component 104 (which may in certain embodiments include an optical capture device and/or a wireless receiver), trigger identifying component 105, processing component 106, and may also include transmitter 107 and memory 108.

According to certain embodiments of the present invention, visual object 101 may be arranged in an open environment, and capture component 104 may capture information 109 from visual object 101. Additionally, in certain embodiments, capture component 104 may also capture further information from transmitter 102A that is associated with visual object 101. For instance, capture component 104 may optically capture visual object 101 and may also comprise a wireless receiver to receive associated information transmitted wirelessly via transmitter 102A, as described in greater detail hereafter. Visual object 101 may comprise various types of non-audible information, such as text, symbols, colors, bar-codes, shape (i.e., the shape of visual object 101 may represent non-audible information), and/or other types of non-audible information. In an alternative embodiment, capture component 104 may not optically capture visual object 101, but may instead capture (e.g., receive) wireless information from transmitter 102A associated with visual object 101.

According to at least one embodiment, capture component 104 may be implemented to optically scan an open environment (e.g., a wide area). Visual object 101 may include an identifying trigger, which may identify to capture device 103 that visual object 101 includes information to be processed by processing component 106. Thus, trigger identifying component 105 may be operable to evaluate visual objects captured by capture component 104 to determine those visual objects within the open environment having the appropriate triggering identifier to trigger processing of such visual objects. As an example, capture device 103 may be implemented in an automobile to capture and process information from road signs (which may also be referred to as "traffic signs"). For instance, capture device 103 may be implemented to capture information from road signs and output such information in audible form. Thus, visual object 101 may comprise a road sign having information to be captured and processed by capture device 103. Accordingly, in certain embodiments of the present invention, a triggering identifier may be included within such road sign, which after being captured by capture component 104, trigger identifying component 105 will recognize such triggering identifier and in response thereto trigger processing component 106 to process the information from such road sign.

For example, as a user drives along a highway, capture component 104 may optically capture the surroundings, which may include buildings, trees, road signs, billboards, and various other visual objects. Upon trigger identifying component 105 recognizing the triggering identifier associated with a road sign, it may trigger processing component 106 to process the information associated with such road sign. Other captured visual objects, such as trees, buildings, etc., that do not include the triggering identifier are not processed by processing component 106, according to certain embodiments of the present invention. Thus, in the above example, processing component 106 may process the road sign to output the information contained on such road sign in an audible form. Thus, supposing the road sign is a "Yield" sign, processing component 106 may audibly speak "Yield," which may aid the driver in easily understanding his/her surroundings.

According to certain embodiments, transmitter 102A may be included to transmit additional information, which may be captured by capture component 104. For instance, continuing with the above example in which visual object 101 is a road sign displaying "Yield," transmitter 102A may wirelessly transmit "Yield to pedestrians" or "Yield to traffic merging onto roadway," thereby providing further information that may be useful to the driver.

Also, transmitter 102A may wirelessly transmit a triggering identifier that identifies visual object 101 as including information to be processed. As further described hereafter, transmitter 102A may wirelessly communicate other useful information to capture device 103. For instance, transmitter 102A may transmit information indicating the language of text presented on visual object 101 (e.g., Spanish), which capture device 103 may utilize in certain embodiments in determining how to properly translate the text to a language preferred by a user. In alternative embodiments, capture component 104 may not optically capture visual object 101, but may instead receive information for processing from transmitter 102A. For instance, visual object 101 may be a road sign that displays "Yield" in a language not understood by a driver. Transmitter 102A may wirelessly transmit information that capture device 103 can interpret to mean "Yield," and processing component 106 of capture device 103 may execute to receive the wireless communication, translate the received communication as "Yield," and audibly output the received "Yield" information in a language understood by the driver. That is, capture device 103 may translate wireless signals received from transmitter 102A into meaningful information understandable by a user.

For instance, in one implementation transmitter 102A may comprise a strobe light that is operable to generate a sequence of light pulses indicating "Yield" (or other information). Capture device 103 may include a receiver operable to receive the wireless communication output by such strobe light, and processing component 106 may interpret the received sequence of light pulses as meaning "Yield" (or other information). In certain embodiments, such a strobe light may comprise a triggering identifier in the information output thereby, which indicates to capture device 103 that such strobe light includes information to be processed by such capture device 103. As an example, the strobe light may output light signals having a particular frequency and/or wavelength, which may effectively act as a triggering identifier to indicate to capture device 103 that such light signals are to be processed thereby. As a further example, such strobe light may comprise a light pulse sequence that identifies that it is outputting information to be processed by capture device 103.

Transmitter 107 may be included in capture device 103 in certain embodiments, which may enable capture device 103 to communicate user preferences, for example, to receiver 102B associated with visual object 101. For instance, again continuing with the above example in which visual object 101 is a road sign displaying "Yield," a driver may specify to capture device 103 (e.g., by inputting information to such capture device 103) that he/she wants the exact information on the road sign output audibly, in which case processing component 106 may audibly speak "Yield" to the driver upon encountering such road sign. Alternatively, the driver may specify to capture device 103 that he/she wants the information to be presented in a more "user-friendly" manner, in which case transmitter 107 may communicate this user preference to receiver 102B. In response, receiver 102B may trigger transmitter 102A to transmit the more informative "Yield to traffic merging onto roadway," which capture component 104 may receive and processing component 106 may audibly output to the driver. Thus, in certain embodiments, capture device 103 may be configurable by a user to receive a more user-friendly and/or more informative version of information relating to visual object 101.

Memory 108 may be included within capture device 103, and may be accessible by one or more of components 104–107 of capture device 103. The term "memory" is used broadly herein, and is intended to encompass any suitable data storage device now known or later discovered, including as examples random access memory (RAM), disk drives, floppy disks, optical discs (e.g., Compact Discs (CDs) and Digital Versatile Discs (DVDs)), and other data storage devices. For instance, capture component 104 may store (at least temporarily) captured information in such memory 108. Additionally, trigger identifying information may be stored in such memory 108, which trigger identifying component 105 may access to compare with information captured by capture component 104 to determine whether to trigger processing component 106. Also, processing component 106 may execute software application(s) stored within memory 108 and/or may store data (at least temporarily) to memory 108. Further, user preference information (e.g., whether to receive "user-friendly" information, the desired output language, etc.) may be stored in memory 108, which may be accessible by processing component 106 and/or transmitter 107.

Various types of triggering identifiers may be implemented according to different embodiments of the present invention. As one example, a particular visual identifier, such as a particular shape, color, and/or character may be included within visual object 101, which trigger identifying component 105 may recognize to trigger processing of such visual object 101 by processing component 106. As another example, a triggering identifier may be included within wireless information transmitted by transmitter 102A. For instance, wireless transmitter 102A may communicate an identifier indicating that visual object 101 and/or wireless transmitter 102A itself has information to be processed by processing component 106.

Figure 2:
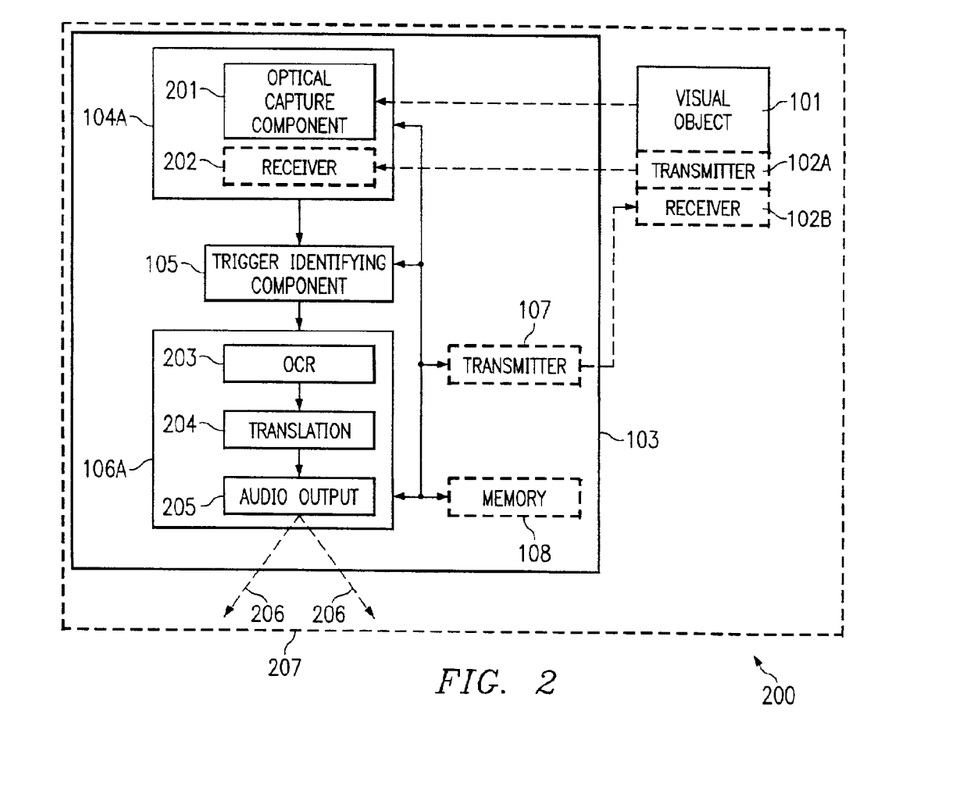
FIG. 2 shows a further example of one embodiment of the present invention.

Turning now to FIG. 2, a further example of one embodiment of the present invention is shown. As shown, system 200 may include visual object 101, which may have associated therewith transmitter 102A and receiver 102B. Capture device 103 is provided, which includes an exemplary implementation of capture component 104 (shown as capture component 104A), trigger identifying component 105, and an exemplary implementation of processing component 106 (shown as processing component 106A). Also, as discussed above with FIG. 1, capture device 103 may include transmitter 107 and memory 108.

Capture component 104A captures information from open environment 207, which may, for instance, be a relatively wide area about an automobile in which capture device 103 is implemented. For instance, in one implementation, open environment 207 may be an area having size of many cubic feet. For example, in one implementation, open environment 207 may have a size of at least 50 feet (ft.) in length by 50 ft. in width by 50 ft. in height (or 125,000 cubic feet). In various embodiments, depending on the type of optical capture component utilized and the amount of resolution desired, the dimensions of open environment 207 may change. For example, the length of open environment 207 may, in certain implementations be at least 100 ft., in other implementations the length may be at least 300 ft., and still in other implementations the length may be at least 500 ft. Further, as advances are made in optical capture devices, the dimensions of open environment 207 may increase therewith. Those of ordinary skill in the art will recognize the dimensions that may be captured by, for example, a wide-angle digital camera, and such dimensions may be applied to open environment 207. Further, multiple scans may be taken at different angles by an optical capture component, which may increase the size of open environment 207 that may be captured. Additionally, as described further hereafter, in at least one embodiment, a first, wide-angle scan may be performed from which identification of triggering identifier(s) may be achieved, and once a triggering identifier is located, a higher-resolution scan may be performed on the area in which such triggering identifier is located to obtain image data of the related visual object at a greater resolution for processing thereof. It should be understood that irrespective of the size of environment 207, various embodiments of the present invention enable such environment 207 to be "open" in that a user is not required to control the specific items from such environment to be captured for processing.

In the example of FIG. 2, capture component 104A includes optical capture component 201 and receiver 202, which may capture information from visual object(s) 101 and associated transmitter(s) 102A arranged within such open environment 207. In this example, capture component 104A includes an optical capture component 201 that is operable to optically capture visual objects within open environment 207 (such as visual object 101). As described in greater detail below, in certain embodiments, optical capture component 201 may capture non-audible information through a two-stage process (e.g., a first stage capturing a triggering identifier associated with a visual object within a wide area, and a second stage focusing capture on such visual object to capture information therefrom at sufficient resolution for processing). Additionally, capture component 104A may include receiver 202 that is operable to receive wireless communication transmitted from certain transmitters within open environment 207 (such as transmitter 102A).

Additionally, in this example, processing component 106A includes an optical character recognition (OCR) component 203, which is operable to recognize captured visual objects as text, for instance. Processing component 106A further includes language translation component 204, which is operable to translate text from one language to another language. Processing component 106A further includes audio output component 205, which may comprise a text-to-speech converter for converting the translated text to speech, as well as speakers for audibly outputting such speech (shown as audio output 206 in FIG. 2). Of course, in other implementations, language translation component 204 may be operable to translate wireless signals (e.g., light pulses, RF signals, etcetera) received from transmitter 102A to a particular language. Further, in certain implementations, translation components may be included for performing translations other than language translation. For example, a translation component may be included which is operable to translate wireless communication received from transmitter 102A (e.g., light pulses, RF signals, etcetera) into meaningful information understandable by a user. For instance, a user may not understand a sequence of light pulses as being meaningful, but a translation component may be included within capture device 103 to translate such a sequence of light pulses as meaningful information to the user (e.g., a sequence of light pulses may be translated as meaning "Yield," as discussed in an example above).

In operation of the exemplary implementation of FIG. 2, one or more visual objects 101 may be included within open environment 207, and optical capture component 201 optically captures such visual object(s) 101 that are present in open environment 207. In a particular implementation, capture device 103 may be included within an automobile, and may be operable to capture visual object(s) from open environment 207 relative to such automobile. It should be understood that open environment 207 may move in accordance with movement of the automobile. Further, in at least one embodiment, capture component 104A is operable to capture non-audible information from stationary visual objects from a moving automobile. That is, capture component 104A is operable to sufficiently capture non-audible information from visual object 101 for processing by processing component 106A even as the automobile in which capture component 103 is moving relative to such visual object (e.g., as automobile's typically move relative to road signs).

As an example, assume that visual object 101 is a road sign displaying "Yield" in a first language not understood by a driver (e.g., Spanish). In at least one embodiment, optical capture component 201 optically captures a digital representation of such visual object 101. More specifically, in certain embodiments, optical capture component 201 may utilize a two-stage optical capture process to optically capture a digital representation of such visual object 101. As described above, in certain embodiments, visual object 101 has associated therewith a triggering identifier. In at least one embodiment, optical capture component 201 may be implemented to initially perform a wide-angle capture of open area 207, and trigger identifying component 105 may evaluate such captured information to identify information of interest for processing within such area 207. For instance, trigger identifying component 105 may evaluate the digital representation of the wide-angle capture of area 207, and may recognize a triggering identifier associated with visual object 101. In response to such recognition by trigger identifying component 105, optical capture component 201 may then optically capture visual object 101 for processing. For instance, optical capture component 201 may zoom-in on visual object 101 to optically capture information therefrom at a sufficiently high resolution for OCR processing by processing component 106A. In some embodiments, such second optical capture may adjust for distance traveled by the automobile in which capture device 103 is implemented. For instance, capture device 103 may be communicatively coupled to the automobile's speedometer, and such capture device may, in performing the second optical capture, adjust for distance traveled since the initial optical scan from which the associated trigger of visual object 101 was identified to enable capture of visual object 101 at a sufficiently high resolution for processing in the second optical capture.

Once visual object 101 is properly captured for processing, trigger identifying component 105 may trigger processing component 106A to process the digital representation of visual object 101. More specifically, in the exemplary implementation of FIG. 2, OCR component 203 may receive the image data and convert it to the corresponding text for "Yield" in the first language in which it is displayed on the road sign. Language translation component 204 may then translate the text from the first language (e.g., Spanish) into a second language that is understood by the driver (e.g., English). Thereafter, audio output component 205 may execute to convert the translated language from text to speech and audibly output the speech as audible output 206. Thus, as the driver's automobile approaches such "Yield" sign that displays "Yield" in a language not understood by the driver (e.g., Spanish), capture device 103 may operate to audibly communicate the "Yield" message in a language understood by the driver (e.g., English).

In certain embodiments of the present invention, receiver 202 may be used to receive information relating to visual object 101 (e.g., "yield" sign), rather than (or in addition to) optical capture component 201 optically scanning such visual object. Thus, in certain embodiments, capture component 104A may not include optical capture component 201, as receiver 202 may be utilized to wirelessly receive information relating to visual object(s) 101 from transmitter(s) 102A associated with such visual object(s) 101. Additionally, processing component 106A may include further processing components (not shown in FIG. 2) that are operable to recognize the received information from transmitter 102A and audibly output such information in an appropriate language for the driver. In certain embodiments, processing components other than those shown in FIG. 2 may be included in processing component 106, which may be operable to process wireless communication received by receiver 202 (e.g., to audibly output such wireless communication in a language understood by the user). Also, the information included in such wireless communication may, for instance, include greater information than actually presented on visual object 101. Continuing with the above example, such communication may further notify the user of the particular condition to which the user is to "Yield," such as pedestrians or merging traffic.

In certain embodiments, capture device 103 may provide a user with the option of receiving captured information in a more user-friendly or informative manner. For instance, if the user so desires to hear a more informative version of the "Yield" sign of the above example, capture device 103 may activate transmitter 107 to wirelessly transmit a signal to receiver 102B associated with visual display 101 (e.g., the "Yield" road sign). In response, receiver 102B may trigger wireless transmitter 102A to transmit more information associated with visual display 101. Such transmitted information is received by receiver 202 of capture component 104A, which may pass the received information to processing component 106A. For instance, in one implementation, wireless transmitter 102A may be a strobe light that communicates a light pulse sequence recognizable by receiver 202. In another implementation, transmitter 102A may communicate information via RF recognizable by receiver 202.

Also, in certain embodiments, information captured from visual object 101 and/or received from transmitter 102A may be stored in memory 108, and capture device 103 may allow a user to playback such information. For instance, suppose visual object 101 is a speed limit sign notifying the driver that the speed limit along the highway being traveled is 70 miles per hour. This information may be audibly communicated to the driver as the driver approaches such speed limit sign. Also, the received speed limit information may be stored in memory 108 for later retrieval by the driver. Thus, if the driver is later unable to remember the speed limit of the highway, he/she may playback the last speed limit sign encountered. In certain embodiments, information captured from road signs may be arranged as a database, or other suitable data arrangement, and in at least one embodiment, various types of information may be categorized into different categories. For instance, speed limit information may be stored in one category, while directional information (e.g., "Los Angeles 25 miles") may be stored in a different category. Accordingly, a user may playback information from each category. Thus, for instance, the user may scroll back through X number of directional information stored in a directional category, or the user may playback the latest speed limit information from its corresponding category.

In certain embodiments, processing component 106A may include intelligence for determining, based on the information included within such received visual object, in which category it should be stored. Alternatively, the triggering identifier associated with visual object 101 may not only indicate that it includes information to be processed, but it may further indicate the appropriate category of the information. As a relatively simple example, a colored star may be implemented on road signs as a triggering identifier. Further, the particular color of the star may indicate the category of its information. For instance, red and blue stars on a road sign may each indicate that the information of the road sign is to be processed by processing component 106A. Additionally, red stars may indicate that the information is categorized as speed limit information, while blue stars may indicate that the information is categorized as directional information. Alternatively, wireless information transmitted by transmitter 102A may indicate the proper category of such information.

Figure 3:
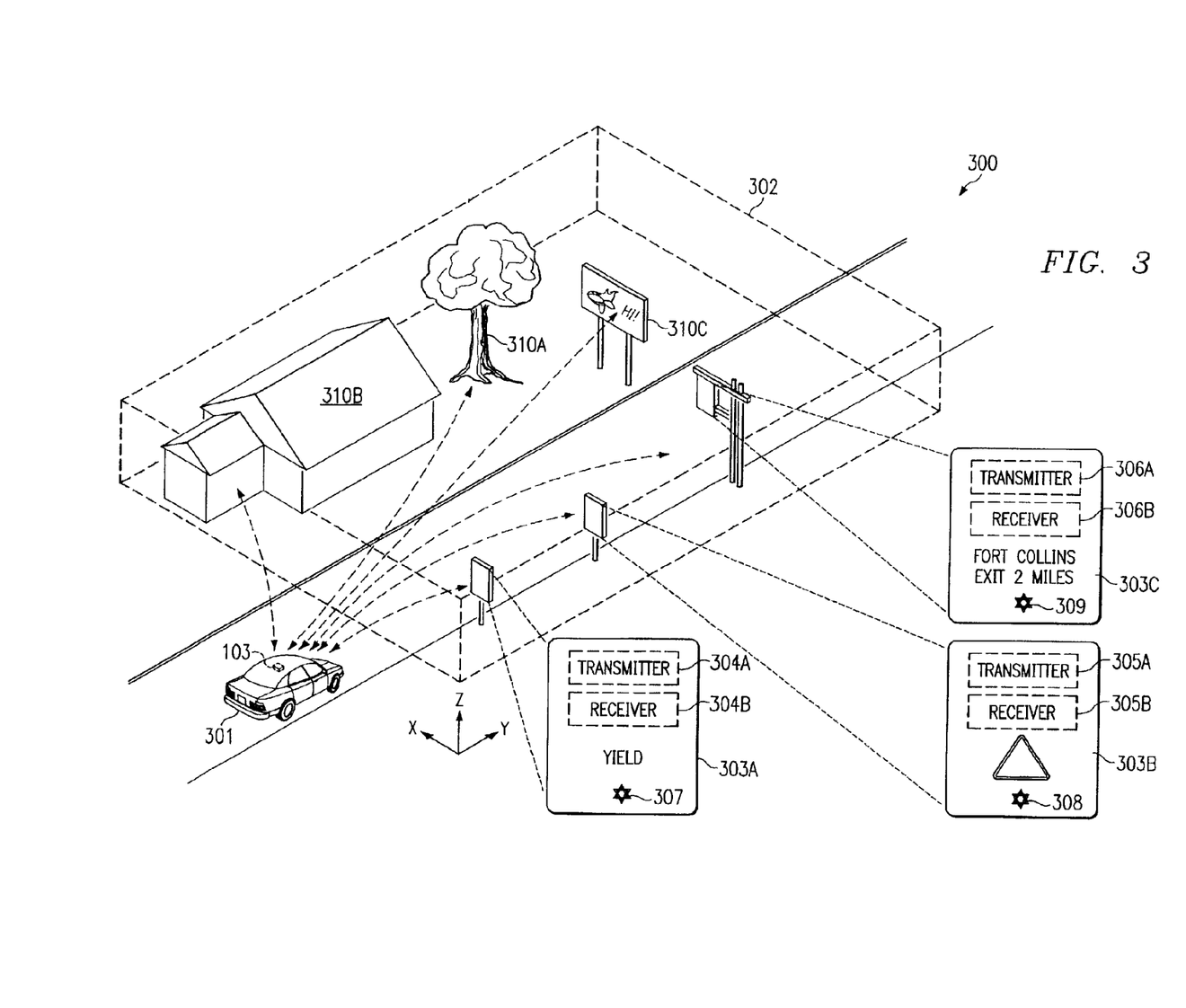
FIG. 3 shows an exemplary implementation of one embodiment of the present invention that includes a capture device arranged within an automobile.

Turning to FIG. 3, an example of a specific implementation of one embodiment of the present invention is shown. As shown, system 300 is provided, which includes automobile 301 having included therewith capture device 103. Capture device 103 may be integrated within automobile 301, it may be removably coupled to automobile 301, or it may be placed in automobile 301. For instance, capture device 103 may be a handheld device (e.g., a palm-size device) that may be placed in automobile 301, preferably within view of a window of automobile 301. For example, capture device 103 may be included within a personal digital assistant (PDA), a pager device, or a cellular telephone to further provide functionality as described herein. As shown in FIG. 3, capture device 103 is operable to optically capture visual objects and receive wireless communication from transmitters associated with certain visual objects within open environment 302. In this example, various visual objects, such as traffic signs 303A, 303B, and 303C (collectively referred to as traffic signs 303), tree 310A, building 310B, and billboard 310C (collectively referred to herein as non-triggering visual objects 310), are included within open environment 302. Capture device 103 may optically capture digital representations of all of such visual objects 303 and 310 within open environment 302. That is, as automobile 301 drives along a road, capture device 103 may capture information from open environment 302, which may have length Y of approximately 500 ft., width X of approximately 100 ft., and height Z of approximately 50 ft., as an example.

Capture device 103 may periodically capture information from the open environment 302 relative to automobile 301. According to certain embodiments, the capture frequency may be adjusted depending on the speed at which automobile 301 is traveling and/or the density of the triggering visual objects. For instance, capture device 103 may be communicatively coupled to the speedometer of automobile 301 and may vary the frequency at which it performs optical scanning depending on the speed at which automobile 301 is traveling. As an example, if the driver is traveling 25 miles per hour (mph), optical scans of environment 302 relative to automobile 301 may be performed at a relatively slower frequency than when automobile 301 is traveling 70 mph. The frequency of the optical scanning may increase with the speed at which automobile 301 is traveling because, for example, the surrounding environment of automobile 301 change more frequently with such increased speed. Also, the capture frequency may be adjusted by capture device 103 depending on the density of triggering visual objects encountered. For instance, if the number of triggering visual objects (i.e., visual objects that trigger processing by capture device 103) encountered within a given area (or within a given time frame) increases, then the frequency at which optical capturing is performed may be likewise increased, and as the number of triggering visual objects encountered within a given area (or within a given time frame) decreases, the frequency at which optical capturing is performed may be decreased. The frequency of optical scanning may increase in areas having a high density of triggering visual objects to reduce the likelihood of capture device 103 failing to capture such a triggering visual object.

Traffic signs 303A, 303B, and 303C have associated therewith triggering identifier 307, 308, and 309, respectively. In this example, triggering identifiers 307, 308, and 309 are included as part of the visual indicia of such traffic signs 303. As described above, in alternative embodiments, a triggering identifier may instead be communicated by a transmitter associated with such traffic signs, such as transmitters 304A, 305A, and 306A. Because visual objects 310 do not have a triggering identifier associated therewith, capture device 103 may discard the captured digital representation of such visual objects 310. However, capture device 103 processes traffic signs 303 in response to recognition of their associated triggering identifiers.

According to one embodiment, capture device 103 may process the captured visual objects to translate the captured object from a first language to a different language and/or audibly communicate the captured information to the driver of automobile 301. For instance, in this example, traffic sign 303A displays "Yield" in English. Assuming that the driver of automobile 301 does not understand (or is unable to read) the English language, capture device 103 may translate the "Yield" message to a language with which the driver is more familiar (e.g., French), and may audibly speak the message in such language to the driver. As traffic sign 303B illustrates, the visual indicia included on a traffic sign may be something other than text. For instance, a symbol representing "Yield" may be displayed. The driver of automobile 301 may be unfamiliar with the Yield symbol displayed on traffic sign 303B. However, capture device 103 may be capable of processing the symbol and recognizing it as meaning yield, and may audibly communicate such yield message to the driver in an appropriate language understood by the driver. A further example of information that may be presented on a traffic sign is provided with traffic sign 303C, which displays directional information. More specifically, traffic sign 303C includes text indicating that "Fort Collins Exit 2 Miles." Again, the driver of automobile 301 may be unable to sufficiently read/understand the language in which such message is presented. Therefore, capture device 103 may translate the text from the language in which it is displayed on sign 303C (e.g., English) to a language understood by the driver (e.g., French), and may then audibly speak the message to the driver in the language understood by the driver.

Also, in certain embodiments, capture device 103 may execute in conjunction with a mapping application, wherein a user may map a course, e.g., from Dallas to Los Angeles, and capture device 103 may alert the user as to relevant road signs for such route (e.g., may ignore such signs as "exit 5 miles for Chicago"). More specifically, a mapping application may be communicatively accessible to capture device 103. For instance, a mapping application may be stored in memory within capture device and execute on a processor within capture device 103, or such mapping application may be stored and executed by a processor external to capture device 103 but communicatively accessible thereby. Using methods now known or later developed, such a mapping application may enable a user to designate a particular route to be followed in traveling from a first geographic location to a second geographic location, and/or the mapping application may be capable of generating such a route between two geographic locations specified by a user (e.g., a route that is the fastest, shortest distance, most scenic, etcetera). Also, depending on the intelligence of the mapping application, a user may specify particular points of interest (e.g., restaurants, gas stations, hotels, hospitals, or other points of interest) along the route, and capture device 103 may particularly capture information relating to such points of interest and specifically alert the user as a specified point of interest is approached. For example, the capture device may sound a special alert or otherwise designate to the user that information relating to a specified point of interest has been captured thereby. Thus, for instance, as a user is traveling the user may become hungry and desire to be alerted as to information captured by capture device 103 relating to food exits, and capture device 103 may be capable of determining whether captured information qualifies as such point of interest and notify the user upon information being captured that does qualify as relating to such point of interest (e.g., restaurants or food exit).

In at least one embodiment, a database of shapes/patterns may be stored within memory 108 of capture device 103, and trigger identifying component 105 and/or processing component 106 of such capture device 103 may be operable to perform matching of captured shapes/patterns with such stored shapes/patterns. As an example, the database may include known shapes or symbols commonly used for or included on traffic signs, as well as standard shapes or symbols for representing hotels, gas stations, national or state parks, hospitals, or other points of interest. As one example, the Vienna convention of 1968 (and was amended in 1993) attempted to standardize the traffic signs to be used on the road by specifying particular forms for various types of traffic signs, including warning signs, priority signs, prohibition signs, obligation signs, other prescription signs, information signs, direction signs, and signs providing additional information (e.g., supplemental signs, which supplement information on a main sign). Such shape and symbol information may be stored within capture device 103 and utilized to perform pattern matching (e.g., by trigger identifying component 105 or processing component 106) to gain information from a traffic sign encountered.

In the prior art, optical scanners (both handheld and table top) exist for scanning bar codes presented thereto. For instance, such optical scanners are commonly implemented in point of sale systems (e.g., cash registers) for scanning bar code information from a product to process a sales transaction of such product. Thus, such optical scanners may recognize a bar code from a product as containing information to be processed. However, in such a closed environment, the optical scanner is tuned to recognize bar codes, and the user (i.e., the sales clerk) controls the particular bar code to be scanned by the optical scanner. That is, the user dictates a particular positional relation between the bar code to be optically scanned and the optical scanner, thereby specifying the particular bar code to be captured for processing. Furthermore, such positional relation is generally relatively limited in that the bar code is typically required to be positioned relatively close to the optical scanner for the optical scanner to capture the bar code information.

However, in at least one embodiment of the present invention, a bar code may be implemented on a traffic sign for capture by capture device 103. In at least one implementation, such bar code may be scaled up in size (by a certain percentage) for presentation on the traffic sign to allow for accurate capture of such bar code by an optical capture component of capture device 103. Once captured by capture device 103, the bar code may be converted from raster to vector form (utilizing known techniques for such conversion) and scaled to the appropriate size for processing by, for example, known bar code reading technology.

As described above, various embodiments of the present invention provide a system and method that enable capture of non-audible information from an open-environment. That is, certain embodiments enable capture of non-audible information by a capture device for processing of such non-audible information, without requiring that a user control the particular non-audible information to be captured for processing. In certain embodiments, a user may specify the type of information in which the user is interested, and capture device 103 alerts the user when the desired information is sensed. For example, the user may specify a particular route within a mapping application (e.g., such as any software application for mapping travel directions that is now known or later developed), which may be stored and executing within capture device 103 or within a processor-based device to which capture device 103 may be communicatively coupled. Capture device 103 may alert the user to information related to such route (e.g., directional information relevant to such route) that is captured as the user is traveling, and capture device may forego alerting the user of information that is not relevant to such route (e.g., directional information that is not relevant to the user-specified route). As another example, a user may specify particular type(s) of information for which the user is to be alerted, such as particular points of interest (e.g., gas stations, restaurants, hotels, etcetera) as the user is traveling.

In at least one embodiment, visual objects are optically captured by a capture device and the digital representation of such visual objects may be processed by the capture device (e.g., may be translated to a different language and/or translated to an audible form). Thus, a passive visual object may be optically scanned by a capture device in certain embodiments. In other embodiments, wireless information transmitted by a transmitter associated with a visual object is received by a capture device for processing thereof. Thus, an active transmitter associated with a visual object may actively transmit information relating to the visual object in certain embodiments, wherein such information may be received by a capture device for processing.

While various examples above have described embodiments of the present invention as being implemented within an automobile for processing information from road signs, it should be understood that various other types of implementations are intended to be within the scope of the present invention. For instance, capture device 103 may be implemented within various modes of transportation, including as examples, bicycles, scooters, and wheelchairs, and may aid the user of such transport mechanism in understanding his/her surroundings. As another example, capture device 103 may be a handheld device, which a user may carry along with him/her, and such capture device 103 may aid the user in understanding his/her surroundings. For instance, visual objects may be arranged within a store, such as sale posters, from which capture device 103 may capture information and process such information to aid a user in understanding the visual objects. As described above, in certain implementations, the visual objects may have wireless transmitters associated therewith to wirelessly transmit information relating to the visual objects, which capture device 103 may receive and process.

One advantage of one aspect of certain embodiments is that a capture device is provided that is capable of receiving non-audible information and processing such information to aid a user in understanding his/her surroundings in situations where the user may not otherwise be able to understand the surroundings. For instance, if a user is unable to read/understand visual objects in the user's surrounding environment, such capture device may aid the user in understanding such visual objects. For example, in one implementation, the capture device can translate the visual object to an appropriate language understood by a user. Further, in certain implementations, the capture device may aid the user to understand his/her surroundings in a timely manner. For instance, when a user is operating an automobile (or other transport mechanism), the user may have a limited amount of time in which to understand surrounding visual objects (such as road signs), and the capture device may aid the user in quickly understanding such surrounding visual objects by audibly speaking the information related to the visual objects in a language understood by the user.

What is claimed is:

1. A system for capturing non-audible information for processing thereof, said system comprising:
   optical capture device operable to optically scan an area;
   said optical capture device operable to recognize a triggering identifier associated with a visual object within said area; and
   said optical capture device operable to process non-audible information captured thereby from said visual object in response to said optical capture device recognizing said triggering identifier associated with said visual object;
   wherein said optical capture device comprises a processing component operable, responsive to recognizing said triggering identifier, to perform optical character recognition to recognize at least a portion of said non-audible information as visual indicia and further operable to translate said visual indicia to a particular language.

2. The system of claim 1 further comprising:
   receiver operable to receive wireless communication.

3. The system of claim 2 wherein said triggering identifier is included within wireless communication received by said receiver.

4. The system of claim 1 further comprising:
   transmitter associated with said visual object, said transmitter operable to transmit wireless communication.

5. The system of claim 1 wherein said optical capture device comprises:
   trigger identifying component operable to analyze information optically captured by said optical capture device and recognize said triggering identifier therefrom.

6. The system of claim 1 wherein said visual indicia includes indicia selected from the group consisting of:
   text, symbol, and shape.

7. The system of claim 1 wherein said processing component is operable to translate said visual indicia to said particular language that is selected by a user.

8. The system of claim 1, wherein said processing component is further operable to convert said visual indicia to speech and audibly output said speech.

9. The system of claim 1 wherein said visual object includes a road sign.

10. The system of claim 1 wherein said visual object includes a transmitter associated therewith operable to wirelessly transmit information relating to said visual object, and wherein said capture component includes a receiver operable to receive the wirelessly transmitted information.

11. The system of claim 1 wherein said optical capture device further comprises:
    processing component operable to receive an indication of at least one type of information in which a user is interested and determine whether said non-audible information captured by said optical capture device qualifies as said at least one type of information in which said user is interested.

12. The system of claim 11 wherein said at least one type of information in which a user is interested includes a directional information relevant to a particular route being traveled.

13. The system of claim 12 wherein said optical capture device is operable to alert a user as to non-audible information captured thereby that is determined to be directional information determined relevant to said route, and said optical capture device is operable to forego alerting a user as to non-audible information captured thereby that is determined to be directional information that is not relevant to said route.

14. The system of claim 12 wherein said particular route is provided by a mapping application communicatively accessible by said optical capture device.

15. The system of claim 11 wherein said at least one type of information in which a user is interested includes information related to at least one point of interest along a route being traveled.

16. The system of claim 15 wherein said at least one point of interest includes at least one type selected from the group consisting of:
    gas station, hotel, restaurant, rest area, hospital, and park.

17. A system for capturing non-audible information for processing thereof, said system comprising:
    optical capture device operable to perform a wide-area optical scan of said area;
    said optical capture device operable to recognize from said wide-area optical scan a triggering identifier associated with a visual object within said area, wherein said optical capture device is further operable, responsive to recognizing said triggering identifier, to optically scan said visual object at a higher resolution than said wide-area optical scan; and
    said optical capture device operable to process non-audible information captured from said visual object at said higher resolution.

18. The system of claim 17 wherein said optical capture device is operable to account for distance traveled by a transport mechanism since performance of said wide-area optical scan in then performing said higher resolution optical scan.

19. The system of claim 18 wherein said transport mechanism is selected from the group consisting of: automobile, bicycle, scooter, and wheelchair.

20. The system of claim 17 wherein said wide-area is an area of at least size 10,000 cubic feet relative to said optical capture device.

21. A system for capturing non-audible information for processing thereof, said system comprising:

optical capture device that is implemented within a transport mechanism and is operable to periodically perform an optical scan of an area, wherein said optical capture device is operable to adjust the frequency of performing said optical scan based at least in part on at least one of (a) speed at which said transport mechanism is traveling, and (b) density of visual objects encountered having a triggering identifier associated therewith;

said optical capture device operable to recognize a triggering identifier associated with a visual object within said area; and said optical capture device operable to process non-audible information captured thereby from said visual object in response to said optical capture device recognizing said triggering identifier associated with said visual object.

22. A method for capturing non-audible information for processing thereof, said method comprising:

performing a wide-area optical scan of an area utilizing an optical capture device;

said optical capture device recognizing, from said wide-area optical scan, a triggering identifier associated with a visual object within said area;

responsive to recognizing said triggering identifier, optically scanning said visual object at a higher resolution than said wide-area optical scan; and said optical capture device processing non-audible information captured thereby at said higher resolution from said visual object.

23. The method of claim 22 wherein said optical capture device is implemented within a transport mechanism, further comprising:

said optical capture device accounting for distance traveled since performance of said wide-area optical scan in then performing a higher resolution optical scan.

24. The method of claim 22 further comprising the steps of:

receiving an indication of at least one type of information in which a user is interested; and determining whether said non-audible information captured by said optical capture device qualifies as said at least one type of information in which said user is interested.

25. The method of claim 24 wherein said at least one type of information in which a user is interested includes directional information relevant to a particular route being traveled.

26. The method of claim 25 wherein said particular route is provided by a mapping application.

27. The method of claim 24 wherein said at least one type of information in which a user is interested includes information related to at least one point of interest along a route being traveled.

28. The method of claim 27 wherein said at least one point of interest includes at least one type selected from the group consisting of:

gas station, hotel, restaurant, rest area, hospital, and park.

29. A method for capturing non-audible information for processing thereof, said method comprising:

periodically optically scanning an area utilizing an optical capture device implemented within a transport mechanism;

said optical capture device recognizing a triggering identifier associated with a visual object within said area;

responsive to said triggering identifier, said optical capture device processing non-audible information captured thereby from said visual object; and said optical capture device adjusting the frequency of said optically scanning based at least in part on at least one of (a) speed at which said transport mechanism is traveling and (b) density of visual objects encountered having a triggering identifier associated therewith.

30. A method for capturing non-audible information for processing thereof, said method comprising:

optically scanning an area utilizing an optical capture device;

said optical capture device recognizing a triggering identifier associated with a visual object within said area; and responsive to said triggering identifier, said optical capture device processing non-audible information captured thereby from said visual object, wherein said processing includes (a) performing optical character recognition to recognize at least a portion of said visual object as a visual indicia, (b) translating said visual indicia to a particular language, (c) converting said translated visual indicia to speech, and (d) audibly outputting said speech.

31. An optical capture device for capturing non-audible information, said optical capture device comprising:

means for optically scanning an open-environment;

means for recognizing a triggering identifier associated with a visual object within said open-environment; and means for processing non-audible information captured by said means for optically scanning from said visual object in response to the recognizing means recognizing said triggering identifier associated with said visual object, wherein the processing means translates said non-audible information from a first language to a second language and converts said translated non-audible information into audible form.

32. The optical capture device of claim 31 wherein said means for optically scanning is operable to perform a wide-area optical scan of said open-environment.

33. The optical capture device of claim 32 wherein said means for optically scanning is further operable to, responsive to recognition of said triggering identifier by said recognizing means, optically scan said visual object at a higher resolution than said wide-area optical scan.

34. The optical capture device of claim 31 implemented within a transport mechanism, wherein said means for optically scanning is operable to periodically perform an optical scan.

35. The optical capture device of claim 34 wherein said means for optically scanning is operable to adjust the frequency of performing said optical scan based at least in part on at least one of the following:

speed at which said transport mechanism is traveling and density of visual objects encountered having a triggering identifier associated therewith.

36. A system for capturing non-audible information, said system comprising:

capture component operable to capture non-audible information associated with a visual object;

trigger identifying component operable to recognize a triggering identifier associated with said non-audible information; and processing component operable to process said non-audible information captured by said capture component in response to the trigger identifying component recognizing said triggering identifier associated with said non-audible information, wherein the processing component translates said non-audible information to a particular language and converts said translated non-audible information into audible form.

37. The system of claim 36 wherein said capture component comprises at least one wireless receiver operable to capture said non-audible information.

38. The system of claim 37 wherein the visual object has a transmitter associated therewith for transmitting wireless communication.

39. The system of claim 38 wherein said wireless communication comprises at least one type selected from the group consisting of:

light pulses, radio frequency (RF), and cellular.

40. The system of claim 36 implemented within a transport mechanism.

41. The system of claim 36 wherein the visual object comprises a traffic sign.

42. The system of claim 36 wherein said capture component comprises at least one optical capture component.

43. The system of claim 36 wherein said non-audible information associated with said visual object comprises information displayed by said visual object.

* * * * *

UNITED STATES PATENT AND TRADEMARK OFFICE
CERTIFICATE OF CORRECTION

PATENT NO. : 6,937,747 B2  Page 1 of 1
APPLICATION NO. : 09/962690
DATED : August 30, 2005
INVENTOR(S) : Jerlyn R. Culp et al.

It is certified that error appears in the above-identified patent and that said Letters Patent is hereby corrected as shown below:

On the Title page, in field (73), in "Assignee", in column 1, line 1, delete "Hewlett Packard" and insert -- Hewlett-Packard --, therefor.

In column 14, line 7, in Claim 8, delete "claim 1," and insert -- claim 1 --, therefor.

Signed and Sealed this

Nineteenth Day of May, 2009

JOHN DOLL
*Acting Director of the United States Patent and Trademark Office*